Figure 1:
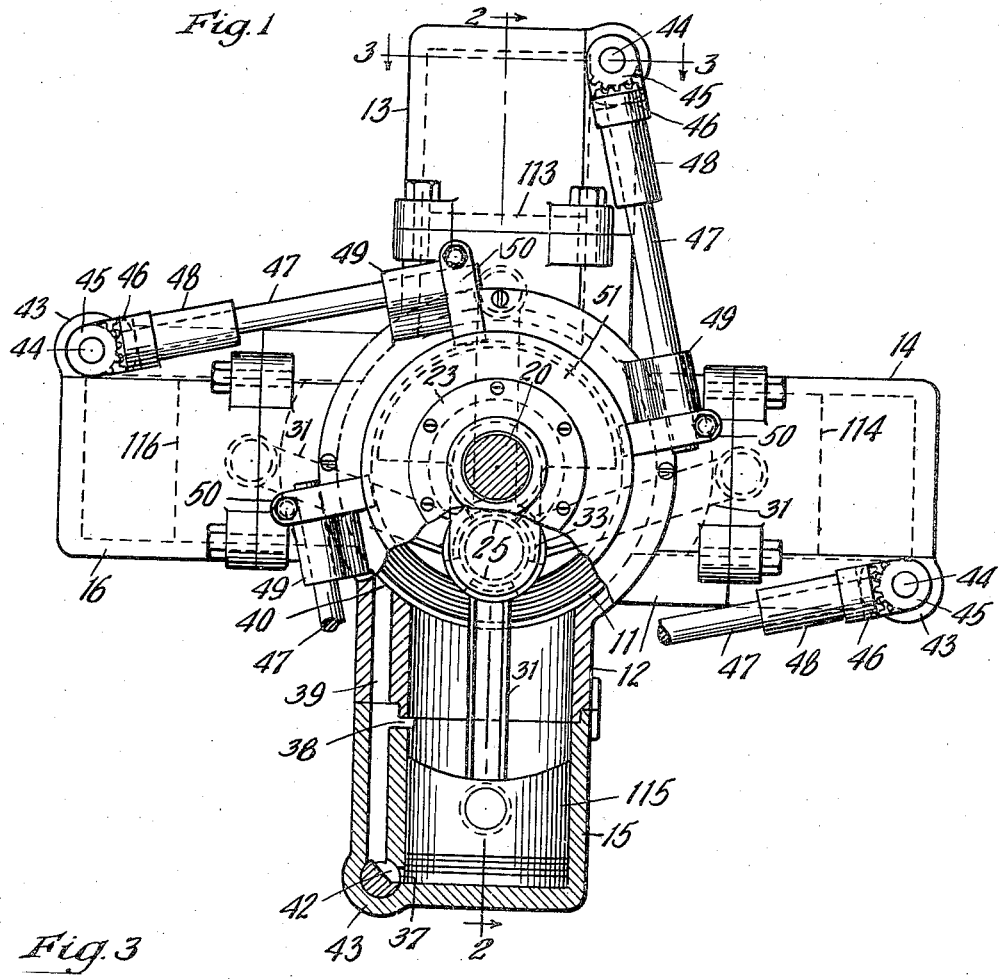

Feb. 22, 1938.   A. BENSON   2,109,227
POWER TRANSMITTING MECHANISM
Filed June 13, 1935   2 Sheets-Sheet 1

Inventor
Andrew Benson
By Joseph Harris
his Atty.

Feb. 22, 1938. A. BENSON 2,109,227
POWER TRANSMITTING MECHANISM
Filed June 13, 1935 2 Sheets-Sheet 2
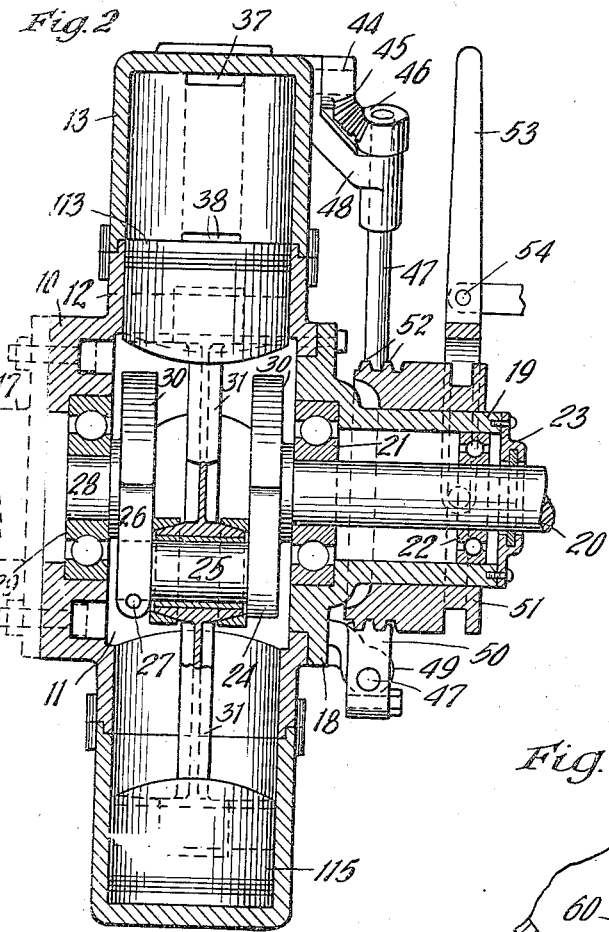
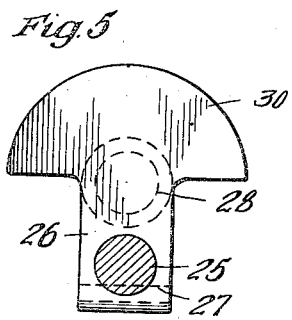
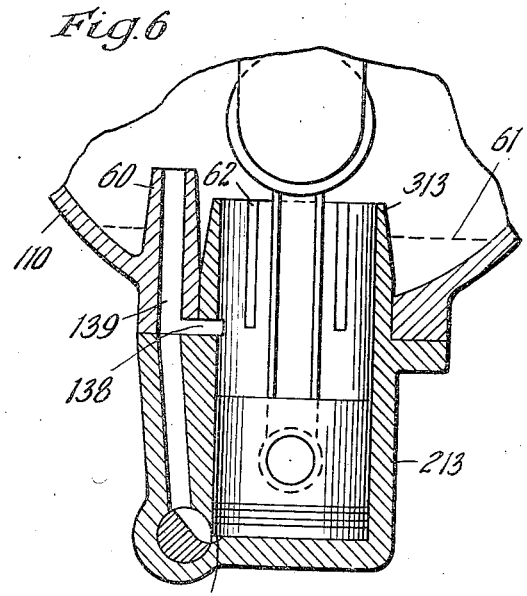
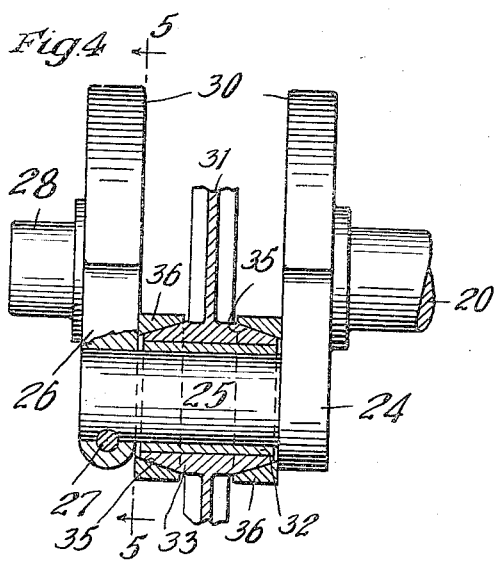
Inventor
Andrew Benson
By Joseph Harris
his Atty.

Patented Feb. 22, 1938

2,109,227

UNITED STATES PATENT OFFICE 2,109,227

POWER TRANSMITTING MECHANISM

Andrew Benson, Wilmette, Ill.

Application June 13, 1935, Serial No. 26,381

4 Claims. (Cl. 192—60)

This invention relates to improvements in power-transmitting mechanism and, more particularly, a pneumatic, variable speed, power-transmitting clutch adapted to be interposed between rotatable driving and driven members.

At the present time, there is a pressing demand for a satisfactory power-transmitting clutch that will deliver power from a driving shaft to a driven shaft under heavy but cushioned torque, particularly in connection with motors of the Diesel type for starting locomotives. Ordinary shaft clutches of either the straight interlocking type or friction type are unsuitable for the class of work indicated. The use of interlocking clutches obviously involves excessive stresses and shocks upon the entire driving arrangement when starting, because of the initial heavy starting load, with consequent danger of damage or, alternatively, the necessity of using excessively heavy construction. The friction type of clutches, using a substantially constant friction resistance between the driving and driven parts at any given time, generally either slip and thereby rapidly wear out or, if the friction elements are made to engage sufficiently tight to prevent slipping, the same disadvantages arise as in the case of interlocking clutches.

I am aware that various types of fluid clutches have heretofore been proposed, principally for use on automobiles, but the same are not suitable for the heavy torque starting loads such as involved in the Diesel type locomotives. In the prior types of proposed fluid variable speed clutches, there has generally been involved either the transference of an incompressible medium, such as oil, through ports of variable capacity, or the gradual building up and maintenance of the pressure of a compressible fluid to resist movement of pistons in cylinders. In both of said fluid types, the resistance interposed between the driving and driven members, at any particular time during the starting action, is substantially a constant and continuous resistance or drag without any intervening intermittent drops in the resistance, thus resulting in disadvantages similar to those present in connection with friction clutches.

One object of the present invention is to provide a variable speed power-transmitting mechanism employing a readily compressible gaseous fluid, such as air, so constructed and operable that, for any given setting of the parts, the power from the driving to the driven member will be imparted by a rapid series of wholly independent and distinctive but individually cushioned impulses, as distinguished from a continuing substantially constant resistance whereby the torque transmitted to the driven member may be greatly increased to facilitate starting.

Another object of the invention is to provide a mechanism of the character indicated in the preceding paragraph wherein the effective amount of power transmitted by each and every impulse may be varied gradually from zero to the maximum available from the driving member whereby to gradually increase the speed of the driven member from zero to that of the driving member as desired.

More specifically, an object of the invention is to provide a mechanism of the character indicated which comprises a series of cylinders and associated pistons respectively connected to driving and driven shafts and wherein each piston and associated cylinder operates independently of every other piston and associated cylinder and has its own complete cycle consisting of a compression stroke of the gaseous fluid, a return stroke with the pressure in the cylinder returned to zero or atmosphere at the inner end of the piston stroke, and a new charge or slug of the gaseous fluid for compression from minimum to maximum during each cycle of the piston and cylinder.

Other objects of the invention are: To provide an arrangement wherein the supply of compressible fluid, such as air, is contained within a housing substantially sealed off from atmosphere so that the fluid employed in the cylinders is constantly re-used with minimum possibility of foreign matter being drawn into the mechanism; to provide for suitable lubrication of the relatively movable parts without danger of the lubricant becoming concentrated in and choking any cylinder; and to provide an arrangement which is relatively inexpensive to manufacture, comprised of few parts and efficient in operation.

Other objects of the invention will more clearly appear from the description and claims hereinafter following.

Figure 3:
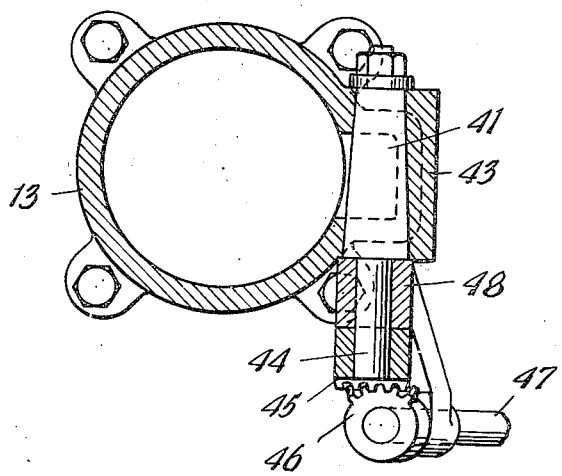

In the drawings forming a part of this specification, Figure 1 is an elevational view of a power transmitter embodying the improvements, portions of one of the cylinders being broken away in order to better disclose certain of the interior construction. Figure 2 is a vertical sectional view corresponding substantially to the section line 2—2 of Figure 1. Figure 3 is a horizontal sectional view, upon an enlarged scale, corresponding to the line 3—3 of Figure 1. Figure 4 is a view, upon an enlarged scale and partly in section, illustrating certain details of construction. Figure 5 is a vertical sectional view corresponding substantially to the line 5—5 of Figure 4 but upon a reduced scale corresponding to that of Figure 2. And Figure 6 is a broken sectional view similar to that of part of Figure 1, illustrating certain modifications.

In the drawings, and referring first to the construction illustrated in Figures 1 to 5, 10 indicates a main housing, preferably in the form of a casting, which is of generally cylindrical shape and provided with a central air chamber 11. The housing 10 is provided with a plurality of radially extending integral blocks 12—12 equidistantly spaced around the housing and to each of which is secured a cylinder head. In the specific arrangement shown, four cylinders are employed referenced respectively 13, 14, 15, and 16 although, as will be understood by those skilled in the art, the number of the radially disposed cylinders may be varied to suit different conditions. The housing 10 may be secured to either the driving or the driven shaft but preferably to the driving shaft indicated by dotted lines at 17, so as to rotate in unison therewith about a horizontal axis, as shown.

The side of the housing 10 remote from the driving shaft is preferably closed by a bolted-on plate 18 with which is integrally formed a bearing sleeve 19 within which is extended the driven shaft 20. The latter is preferably mounted in suitable ball bearings indicated at 21 and 22. To prevent the admission of dirt or other foreign matter to the chamber 11 of the housing 10, the shaft 20 is preferably encircled by a dust-guard 23 secured to the outer end of the bearing sleeve 19 as shown in Figure 2.

At its end within the housing 10, the shaft 20 is provided with a crank arm extension 24 with which is integrally formed a crank pin 25. To the free end of the crank pin 25, is secured another crank arm 26 as by means of the transverse pin 27, said crank arm 26 having a stub journal 28 also preferably supported in a ball bearing 29 seated in the housing casting 10 as shown. Each of the crank arms 24 and 26 is preferably provided with an enlargement 30 diametrically disposed to the crank pin 25 and thereby adapted to function as counterbalances, as will be apparent.

Cooperable with each of the cylinders is a piston, the same being referenced 113, 114, 115, and 116 respectively. Each piston is operatively connected to the crank pin 25 by a suitable pitman 31. The connections of the pitmans to the crank pin 25, as best shown in Figure 4, are preferably effected as follows. Encircling the crank pin is a bushing 32 preferably of bronze or other anti-friction material. Each pitman, at its inner end, is formed with an integral flange 33 extended laterally to each side of the center line of the pitman and conformed on its inner face to the outer cylindrical face of the bushing 32. Each of said flanges 33, as best shown in Figure 1, is of restricted arcuate extent so as to allow for the necessary circumferential movements of the pitmans around the crank pin 25 when the mechanism is operated. On their outermost sides, each of the pitman flanges 33 is chamfered in opposite directions so as to provide conical surfaces 35 which are confined within retainer rings 36—36 having interior conical faces corresponding to the contours of the chamfered surfaces 35 of the pitman flanges. The rings 36 obviously are retained in their position between the two crank arm members 24 and 26. With the construction described, it is evident that each pitman is allowed to freely adjust itself angularly with reference to the crank pin 25 and the connection is relatively inexpensive to construct.

Each cylinder is provided, at its outermost or head end, with an outlet port 37, the same being preferably located in the cylinder wall of the cylinder flush with the head end of the cylinder. Each cylinder is further provided with an air inlet port 38 also disposed in the cylinder wall of the cylinder and so located (as best shown in Figure 2, in the top cylinder thereof) as to be completely uncovered when the respective piston is at the end of its expansion or in-stroke. The set of ports 37 and 38 of each cylinder are preferably in communication with a common air passage 39 extending lengthwise of the cylinder and opening, at its inner end, as indicated at 40, to the central air chamber 11 of the housing.

Each outlet port 37 of the cylinders, is adapted to have its area or capacity varied or adjusted, for the purpose hereinafter described. To this end, there is provided in each cylinder, preferably a plug valve 41 having a port 42 cut therein and so disposed that, when in the position best shown in Figure 1, free communication is provided between the outlet port of the cylinder and the passage 39 but, when rotated, the outlet port may be either partially restricted or completely shut off, as will be apparent. Each plug valve 41 is rotatably mounted in a suitable extension 43 preferably cast integral with the cylinder. As will be seen from the drawings, each plug valve 41 is located as near as possible to the inner wall of the cylinder which fact, taken in conjunction with the fact that the outlet port is flush with the head end of the cylinder, reduces to the practical minimum, the fluid-containing space available at the end of the compression stroke of the piston which in turn insures, when the valve is closed, the maximum practical compression of the air.

All of the valves 41 are adapted to be simultaneously and uniformly operated by the following arrangement. Each valve 41 is provided with a shaft extension 44 carrying at its outer end thereof and rigidly secured thereto, a segmental bevel gear 45. The latter cooperates with a similar segmental bevel gear 46 carried by a radially disposed shaft 47, the outer end of the latter being journaled in a bracket 48 which is also journaled with respect to the plug shaft 44 intermediate the gear 45 thereof and the cylinder extension 43. Each shaft 47 is journaled at its inner end in a bearing bracket 49, the latter being formed integral with the plate 18. The inner end of each shaft 47 has secured thereto a segmental gear 50, all of the latter cooperating with a sleeve 51 having annular rack rings 52 thereon. The sleeve 51 is slidable axially on the fixed sleeve 19 and is adapted to be adjusted axially by means of a lever 53 pivoted to a fixed bracket, as indicated at 54. By oscillating the lever 53, it is obvious that the plug valves 41 may be angularly adjusted in their respective seats so as to vary the area or capacity of each of the cylinder ports 37.

The operation of the improved mechanism is as follows, assuming that the driving shaft is rotating at a uniform speed and that the driven shaft 20 is stationary and under load resisting its rotation. With all of the valves 41 set fully open as shown in Figure 1, rotation of the driving shaft together with the housing 10 produces no substantial effect on the driven shaft 20, inasmuch as the pistons in the respective cylinders will idle freely in and out, there being no appreciable resistance to the piston movements, since the air may circulate freely through the inlet and outlet ports substantially at the minimum or atmospheric pressure. If, then, the valves 41 are slightly turned so as to proportionately restrict the area of the outlet ports of the cylinders, the following action occurs. Referring to the cylinder 13 at the top of Figure 1, where the piston 113 is at its extreme innermost position, there will be a complete charge or slug of air admitted to the cylinder 13. As the housing 10 rotates in unison with the driving shaft, the piston 113 moves on its outward stroke and at the end of a quarter revolution of the housing will have reached the position indicated by the piston 114 in Figure 1. Due to the now somewhat restricted opening of the outlet port 37 of the cylinder 13, a certain degree of compression of the air charge within the cylinder will take place, since the air may not escape freely although, during a 90° movement or partial outward stroke of the piston, the degree of compression will be relatively slight. During the next 90° rotation of the housing with the driving shaft, the piston in the cylinder 13 will continue its outward movement from that shown at 114 in Figure 1 to that indicated at 115 in the same figure at the bottom, and during the approximate last ten or fifteen degrees of movement, the rate of compression of the air, per unit of lineal travel of the piston, will be relatively rapid as compared to the previous rate of compression. As is well known, as the volume of a compressible fluid is reduced one-half within a confined space, the pressure is doubled so that, during the last portion of the piston travel on its compression stroke, say during the last one-eighth of an inch, the pressure rises extremely rapidly. Due to the fact, however, that the outlet port is not closed but only of restricted capacity, there will be no shock since, as the compression and consequent pressure of the charge of air is rapidly increased, the air will be forced out through the restricted outlet port under pressure. There will, however, be imparted to the piston, a definite impulse and a consequent high torque to the driven shaft 20. During the third 90° movement of the driving shaft and housing 10 from that indicated by the piston 115 to that indicated by the piston 116 in Figure 1, the piston may move inwardly freely due both to the fact that such small quantity of air as may have remained highly compressed within the cylinder will tend to expand and when expanded to minimum or atmospheric pressure, more air may enter through the outlet port. As the rotation is continued during the final 90° where the piston reaches its innermost end of the expansion or in-stroke, as shown at the top of Figure 2, a complete new charge of air is admitted and the cycle repeated.

What has been described with reference to a single cylinder and its piston, obviously takes place with respect to each cylinder and associated piston, all independent of each other, so that in the construction illustrated, for a complete rotation of the driving shaft, four separate and independent and each individually cushioned impulses, occurring during the last approximately 10° or 15° of the outward stroke of each piston, will be imparted to the driven shaft. In this connection, it will be noted that at the beginning of each compression stroke of each cylinder, the air in the cylinder is at its minimum or atmospheric pressure so that for each impulse, the pressure rises from said minimum to the maximum governed by the restriction of the outlet port. By further adjusting the valves 41 so as to still more restrict the outlet ports, it is apparent that the maximum degree of pressure attained at the end of each compression impulse, will be raised and the impulse of correspondingly greater effect on the driven shaft but without excessive strain thereon due to the fact that it has gradually acquired momentum from preceding impulses each of graduated lower ultimate or maximum force. As the speed of the driven shaft is finally increased to that approximating the speed of the driving shaft, the valves can be entirely closed, as will be apparent, whereupon the two shafts will rotate in unison with the full power delivered from the driving to the driven shaft.

Referring next to the construction illustrated in Figure 6, 110 indicates the housing corresponding to the housing 10 first described, and 213 indicates one only of the radially disposed cylinders. In this construction, each cylinder 213 has its inner open end 313 extended appreciably radially inwardly of the cylindrical surface of the housing 110. The outlet and inlet ports 137 and 138, located as in the first described form, communicate with a similar common air passage 139 which, however, is extended through an extension 60, to a point well inwardly of the cylindrical surface of the housing, as shown. With this construction, the oil or other lubricant which will ordinarily be disposed within the air chamber of the housing, is prevented from collecting in the cylinders or air passages 139. When the housing is being rotated, the oil will of course be spread or splashed due to the centrifugal action. When at rest, the oil will naturally collect at the bottom of the housing but, due to the extensions 313 and 60 of the cylinder and air passage, as shown in Figure 6, it will collect therearound as indicated by the dotted line 61 and hence be prevented from accumulating within the cylinder or air passage, which might otherwise interfere with efficient action of the mechanism.

Each cylinder 213 may also be provided with auxiliary air inlets in the form of longitudinally extending slots or grooves 62 on the inner side of the cylinder, the lower ends of said slots terminating at such point that they will be partially uncovered when the piston is at the end of its expansion or in-stroke, thus providing for greater ease in admitting the new charge of air in those installations where the speed of rotation of the driving member is particularly high.

Although there has herein been shown and described what is now considered the preferred manner of carrying out the invention, the same is merely illustrative and not by way of limitation, all changes and modifications being contemplated that come within the scope of the claims appended hereto.

What is claimed is:

1. In a power transmitter of the character described, the combination with rotatable driving and driven members; of a substantially cylindrical housing provided with a plurality of radially disposed cylinders and secured to one of said members, each of said cylinders having its inner end extended radially inwardly of the cylindrical surface of the housing; a plurality of pistons, one for and cooperable with each cylinder, operatively connected to the other of said members, each cylinder being provided with outlet and inlet ports and an air passage common to both of said ports, said air passage having an open end terminating in spaced relation inwardly of the cylindrical surface of the housing.

2. In a power transmitter of the character described, the combination with rotatable driving and driven members, one of said members having a single crank pin; of a housing having a central air chamber and a plurality of radially arranged cylinders, each cylinder being provided with an outlet port and a main air inlet port, the latter being in communication with said chamber, each said cylinder being provided also with auxiliary air inlet passages, the auxiliary inlet passages and main inlet port of each cylinder being uncovered at the end of each expansion stroke of each cycle; and a plurality of pistons, one for and cooperable with each cylinder, all of said pistons being operatively connected to said crank pin and the housing being secured to the other of said members.

3. In a power transmitter of the character described, the combination with rotatable driving and driven members, the latter having a single crank pin; of a housing provided with a plurality of radially disposed cylinders secured to said driving member; a plurality of pistons, one for and co-operable with each cylinder, the compression stroke of each piston being such that, at the end thereof, the piston is in approximate contact with the head end of the cylinder; means connecting said pistons with said crank pin including a pitman for each piston and a pair of collars, each pitman having an arcuate flange at its crank-pin end, said flanges being interposed between the collars and the crank pin and of such extent, circumferentially of the pin, as to leave working spaces between adjacent flanges to permit angular adjustment relative to the crank pin as the latter rotates relative to the cylinders; and means for imparting a series of successive and independent, cushioned impulses of controllable and variable intensity from the driving to the driven member including: a supply of air, an outlet port at the head end of each cylinder, and an inlet port in each cylinder so located as to be uncovered when the corresponding piston is at the inner end of its stroke, the set of ports of each cylinder being in communication, independent of each of the other cylinders, with a common source of air whereby the pressure of the air in the cylinders at the beginning of each compression stroke thereof, is always at substantially the same minimum, and adjustable means in each outlet port for each cylinder, located immediately adjacent the piston when the piston is at the end of its compression stroke, for regulating the area of the outlet port and for restricting to a minimum the available volume of fluid-containing space in the cylinder and outlet port at the end of the compression stroke, whereby the ultimate maximum pressure of the compressed air in each cylinder, at the end of each compression stroke therein, may be governed.

4. In a power transmitter of the character described, the combination with rotatable driving and driven members, one of said members being provided with a single crank pin; of a housing having a central air-supply chamber substantially sealed from the atmosphere, said housing being provided with a plurality of radially disposed cylinders therearound, each cylinder having open communication at its inner end with said air-supply chamber; a plurality of pistons, one for and cooperable with each cylinder, all of said pistons being operatively connected to said single crank pin and said housing being secured to the other of said members, the compression stroke of each piston being such that, at the end thereof, the piston is in approximate contact with the head end of the cylinder; and means for imparting a series of successive and independent, cushioned impulses of controllable and variable intensity from the driving to the driven member including: an outlet port at the head end of each cylinder and an inlet port in each cylinder, the latter being so located as to be uncovered when the corresponding piston is at the inner end of its stroke, the sets of ports of each cylinder being in communication, independent of each of the other cylinders, by means of an air passage leading to said central air-supply chamber whereby the pressure of the air in the cylinders at the beginning of each compression stroke, is always at substantially the same minimum, and adjustable means in each outlet port for each cylinder located closely adjacent the piston when the piston is at the end of its compression stroke, for regulating the area of the outlet port and for restricting to a minimum the available volume of fluid-containing space in the cylinder and outlet port at the end of the compression stroke, whereby the ultimate maximum pressure of the compressed air in each cylinder, at the end of each compression stroke therein, may be governed.

ANDREW BENSON.